(12) United States Patent
Pahl et al.

(10) Patent No.: US 12,502,855 B2
(45) Date of Patent: Dec. 23, 2025

(54) APPARATUS AND METHOD FOR MANUFACTURING AT LEAST ONE DRIVE BELT

(71) Applicant: Arntz Beteiligungs GmbH & Co. KG, Höxter (DE)

(72) Inventors: Martin Pahl, Boffzen (DE); Christian Micus, Borgentreich (JP); Wojciech Swierkot, Höxter (DE); Michael Döring, Höxter (DE); Frank Michel, Glashütte (DE)

(73) Assignee: ARNTZ BETEILIGUNGS GMBH & CO. KG, Hoxter (DE)

( * ) Notice: Subject to any disclaimer, the term of this patent is extended or adjusted under 35 U.S.C. 154(b) by 227 days.

(21) Appl. No.: 18/095,739

(22) Filed: Jan. 11, 2023

(65) Prior Publication Data
US 2023/0219313 A1    Jul. 13, 2023

(30) Foreign Application Priority Data

Jan. 11, 2022    (DE) .......................... 102022100504.6

(51) Int. Cl.
*B29D 29/08*    (2006.01)
*B29D 29/10*    (2006.01)
*F16G 5/20*    (2006.01)

(52) U.S. Cl.
CPC .............. *B29D 29/103* (2013.01); *F16G 5/20* (2013.01)

(58) Field of Classification Search
CPC ..................................................... B29D 29/103
See application file for complete search history.

(56) References Cited

U.S. PATENT DOCUMENTS

| 2,600,775 | A | * | 6/1952 | Hurry | .................... B29D 29/10 264/315 |
|---|---|---|---|---|---|
| 3,659,976 | A | | 5/1972 | Yavorsky et al. | |
| 4,984,976 | A | | 1/1991 | Kozachevsky et al. | |
| 2018/0370079 | A1 | | 12/2018 | Tsujino et al. | |

FOREIGN PATENT DOCUMENTS

| CN | 1149531 A * | 5/1997 |
|---|---|---|
| DE | 2517430 A1 | 11/1975 |
| DE | 102015221168 A1 | 5/2017 |

(Continued)

OTHER PUBLICATIONS

European Search Report mailed May 11, 2023 from related/corresponding European Patent Application No. 23151112.2.

*Primary Examiner* — Jeffry H Aftergut
(74) *Attorney, Agent, or Firm* — RENNER, OTTO, BOISSELLE & SKLAR, LLP

(57) ABSTRACT

The invention relates to an apparatus for manufacturing at least one drive belt, comprising a tubular shaping body having a first inner cavity which extends in the longitudinal direction of the shaping body over the entire or predominant length of the shaping body and is surrounded circumferentially by a wall of the shaping body, wherein the inner side of the wall of the shaping body facing the first inner cavity has a shaping surface for abutment and shaping of the drive belt to be produced during the manufacturing process. The invention also relates to a method of manufacturing at least one such drive belt by means of such an apparatus.

21 Claims, 2 Drawing Sheets

(56) References Cited

FOREIGN PATENT DOCUMENTS

| EP | 0442176 | A1 | | 8/1991 |
|----|---------|----|---|--------|
| EP | 3822399 | A1 | | 5/2021 |
| GB | 556811 | A | | 10/1943 |
| GB | 2088277 | A | | 6/1982 |
| JP | 2016-101693 | A | * | 6/2016 |
| SU | 1675111 | A2 | * | 9/1991 |
| WO | WO-98/07561 | A1 | * | 2/1998 |

\* cited by examiner

APPARATUS AND METHOD FOR MANUFACTURING AT LEAST ONE DRIVE BELT

FIELD OF THE INVENTION

The invention relates to an apparatus for manufacturing at least one drive belt, the apparatus having a tubular shaping body having a first inner cavity which extends in the longitudinal direction of the shaping body over the entire or predominant length of the shaping body and is surrounded circumferentially by a wall of the shaping body, wherein the inner side of the wall of the shaping body facing the first inner cavity has a shaping surface for abutment and shaping of the drive belt to be produced during the manufacturing process. The invention also relates to a method of manufacturing at least one such drive belt by means of such an apparatus.

BACKGROUND OF THE INVENTION

Insofar as reference is made here to the manufacture of a drive belt or at least one drive belt with regard to the apparatus and the method, this naturally includes the simultaneous manufacture of a plurality of drive belts by means of one and the same apparatus and during one manufacturing process. In particular, the apparatus according to the invention as well as the method according to the invention enable a simultaneous production of a plurality of drive belts with a correspondingly long shaping body.

Such a drive belt is known, for example, from EP 3 822 399 A1. Such drive belts are used in various applications to transmit mechanical work by kinematically coupling the rotary movements of two or more rotating machine elements between them. In most cases, the drive belt is guided over pulleys which are coupled by the drive belt in the aforementioned sense. The drive belt runs around the belt pulleys on its circumferential surface and transmits tangentially acting driving and driven forces to the belt pulley, which due to the radial distance of the circumferential surface from the axis of rotation result in a torque acting on the belt pulley. Such drive belts are used in different variants, e.g. in the form of V-belts and V-ribbed belts. V-ribbed belts are V-belts with ribs on the side of the V-belt facing the belt pulley.

V-ribbed belts in small profiles allow pulley diameters of less than 50 mm and are therefore used in large quantities for material flow in logistics, e.g. for transferring the drive power of a motor from roller to roller to many conveyor rollers. Accordingly, short V-ribbed belts with lengths of less than 400 mm, and in some cases less than 250 mm, are required.

For economical production, coils with a few hundred ribs are finished in an "inverted" configuration and vulcanized, then cut into 2 or 3 ribs and twisted back into the normal position. For finishing, first the back, then the cord and finally the core layer are applied to a steel drum. Various vulcanization processes are known.

A structured rubber bladder is used especially for short belts: This bears the rib negative on the inside and transfers it to the raw coil by external pressure. Temperature and forming evacuation first support the shaping, followed by vulcanization. After cooling and removal of the pressure, the rubber bladder lifts off the finished coil, which can thus be easily demolded even for small lengths (250-400 mm).

For longer lengths, therefore, the airbag process with a precisely formed wedge-rib profile is common. Instead of remaining on the finishing drum, the raw coil is inserted—if necessary as a kidney—into an outer steel mold, which again has the rib negative on the inside. This is followed by a smooth rubber bladder on the inside, which then presses the raw coil into the steel mold and thus onto the rib negative under internal pressure. Again, temperature and mold evacuation support embossing and vulcanization. The mostly elastic cords accommodate the stretching without problems even for lengths down to 100 mm. After cooling and removal of pressure, the smooth bladder can be easily pulled out, but the coil must be "peeled off" from the steel mold, struck into a kidney and thus pulled out axially. Since it is no longer possible to get an arm into the coils having an interior diameter of less than 125 mm for belt lengths of less than 400 mm, the coils can no longer be traditionally 600 mm high, but only 200 mm high, for example—as far as the fingers can reach.

Since the heat is traditionally introduced by steam and the steel mold has to be designed as a double-walled pressure vessel, the airbag process requires not only high personnel costs for the small coil heights but also high capital expenditure for one pressure vessel per belt length.

SUMMARY OF THE INVENTION

The invention is based on the objective of providing an improved apparatus and a method for the manufacture of at least one drive belt, in which the disadvantages mentioned above are avoided.

This objective is achieved by an apparatus of the aforementioned type in a first variant of the invention in that the shaping body is divided in the longitudinal direction into at least two individual parts which form respective sectors of the shaping body. The sectors may extend over the entire length of the shaping body or a part of this length. The shaping body may, for example, have a substantially hollow cylindrical shape, although on the outside the shape may also be designed to deviate from the cylindrical shape, for example with one or more flattenings. Here the term "sector" is to be understood in the mathematical sense.

Advantageously, the device according to the invention can be used to demold the manufactured drive belt in a particularly simple and gentle manner by separating the sectors of the shaping body from one another again after the individual manufacturing steps have been carried out, in particular by moving the sectors away from one another in the radial direction. Advantageously, the device according to the invention is suitable for carrying out already tried and tested manufacturing steps, in particular for carrying out the known airbag vulcanization, without the disadvantages that occur with known devices, such as the high outlay for demolding and the risk of damage during the demolding process. The device according to the invention is suitable for all common lengths of drive belts, e.g. for lengths in the range from 180 to 700 mm, wherein the molds can in principle be tempered with only one, or at most with four different heating and cooling devices. This minimizes investment costs and set-up time. In addition, a very uniform temperature distribution can be achieved over the circumference and length of the shaping body, in particular with temperature differences of less than 10° C.

According to an advantageous embodiment of the invention, it is provided that the apparatus has a locking device by which the sectors are locked against movement in the axial direction at least in the state assembled to form the shaping body. This fixes the sectors of the shaping body in a defined manner relative to one another, so that no undesirable displacements can occur between the sectors when the manufacturing process of the drive belt is carried out. Here, the sectors are locked by the locking device at least in the axial direction. In addition, the sectors may also be locked in the radial direction by the same locking device or a further locking device. The locking device can be realized, for example, by pins and/or feather keys and corresponding recesses on the respective other part of the sectors of the shaping body to be joined. The device may also have, for example, a cover and a base by which the shaping body is covered at the axial end positions. In this case, the locking device can have, for example, a stop for the individual sectors of the shaping body on the lid and/or on the base.

According to a further variant of the invention, which may also be advantageously combined with the first variant, it is provided that the apparatus has an outer tube formed as a tubular body with a second inner cavity adapted to receive the tubular shaping body, for example the sectors assembled to form the shaping body or a shaping body not divided into sectors. Alternatively, the device may have another outer part disposed outside the tubular shaping body, the outer part forming with the shaping body two radially interengaging components of the apparatus.

The outer tube can be designed, for example, as a hollow cylindrical tube. The outer tube makes it possible to hold the sectors assembled to form the shaping body securely in the radial direction even at high internal pressures, such as those occurring in the airbag process, by inserting the shaping body, i.e. its interconnected sectors, into the outer tube. The further manufacturing steps for producing the drive belt are then carried out in this state. Before the manufactured drive belt is demolded, the shaping body is then removed once again from the outer tube. Advantageously, the outer tube can be designed as a one-piece tube at least in the circumferential direction so that it can absorb high radial forces. In the axial direction, the outer tube can be formed in one or more parts, for example in the form of several outer tube sections.

In the case of a shaping body not divided into sectors, the design of the apparatus as explained, i.e. a component arranged outside the shaping body, namely the outer tube or the outer part, has the advantage that the various dimensionally variable shaping bodies could be designed simply and only a few elaborate outer tubes or outer parts are required, for example those with steam tempering.

According to an advantageous embodiment of the invention, it is provided that the outer tube or outer part is configured for tempering the tubular shaping body by heat transfer. For example, the outer tube or outer part can be heated by one of the heating devices explained below, and thereby the shaping body can in turn be indirectly heated.

According to an advantageous embodiment of the invention, it is provided that the inner diameter of the second inner cavity and the outer diameter of the shaping body form a clearance fit at a temperature below 30° C. This has the advantage that the shaping body with its assembled sectors can be inserted into the outer tube without great force and can be removed therefrom after completion of the manufacturing process. Here, excessive friction between the outer tube and the shaping body is avoided and, accordingly, wear between these parts is also minimized. The same advantages also apply to a shaping body that is not divided into sectors.

According to an advantageous embodiment of the invention, it is provided that the inner diameter of the second inner cavity and the outer diameter of the shaping body form an press fit at a temperature above 80° C. This has the advantage that the individual sectors of the shaping body are held securely in the outer tube in this state, even without additional fixing elements. Another advantage is that a uniformly good heat transfer is established between the outer tube and the shaping body, which makes it possible to heat the entire apparatus by means of a heating device that transfers the thermal heat to the outer tube, for example a heating device arranged outside the outer tube. The heating energy is then transferred from the outer tube to the shaping body without significant losses. The same advantages also apply to a shaping body that is not divided into sectors.

According to an advantageous embodiment of the invention, it is provided that the shaping body or its sectors are made of a material that has a higher coefficient of thermal expansion than the material of the outer tube or the outer part. As a result, the aforementioned press fit at higher temperatures between the outer tube and the shaping body can be realized in a simple manner. For example, the outer tube or outer part can be made of a ferromagnetic material, such as steel. A suitable material for the shaping body is, for example, aluminum. In general, materials that have good thermal conductivity are particularly suitable for the shaping body, whereby any temperature differences on the shaping body are compensated and the temperature differences are below the maximum desired temperature difference of 10° C.

According to an advantageous embodiment of the invention, it is provided that the apparatus has a heating device which is arranged for heating the outer tube or the outer part to a temperature sufficient for carrying out a manufacturing process of the drive belt. In this way, the manufacturing process of the drive belt can be executed in a process-safe, energy-saving and expeditious manner. The shaping body is then heated indirectly via the heat transferred to it from the outer tube or outer part by heat transfer.

Due to the advantageous design of the shaping body and, if applicable, of the outer tube, the heating device can, for example, be designed as an induction heater, a conduction heater and/or a heating device in which a heated gaseous medium is guided through heating channels of the heating device. The heating device can also be a combination of the previously mentioned variants. In an induction heating device, the heat is inductively generated in the device, for example by means of an induction coil arranged around the shaping body or around the outer tube. In conduction heating, the heat is generated conductively, i.e. by resistance heating, e.g. by passing an electric current through the shaping body and/or the outer tube. In the case of heating by gaseous medium, at least part of the apparatus has gas conduction channels through which the gaseous medium is passed, e.g. in the form of a steam heater.

According to an advantageous embodiment of the invention, it is provided that the device has a flexible and/or elastic pressure bellows, in particular in the form of a rubber bladder, which has a smooth or structured outer surface for receiving the raw material for manufacturing the drive belt. Such an elastic pressure bellows, which can be designed similar to an airbag, for example, is then simply inserted into the interior of the shaping body for the manufacturing process when the raw coil has been already inserted there. By applying pressure to the pressure bellows, it then presses the raw coil against the shaping surface of the shaping body.

According to an advantageous embodiment of the invention, it is provided that the pressure bellows has an outer diameter which, at atmospheric pressure inside the pressure bellows, is smaller than the inner diameter of the first inner cavity at least by the thickness of the raw material for producing the drive belt arranged between the shaping body and the pressure bellows. This permits simple and rapid insertion of the pressure bellows into the first inner cavity, at least as long as the pressure bellows is not yet subjected to a greater overpressure. At the same time, the raw material for producing the drive belt has enough space in the gap between the pressure bellows and the forming body and thus does not obstruct the insertion of the pressure bellows.

According to an advantageous embodiment of the invention, it is provided that the apparatus is configured for producing at least one drive belt with a rib structure, in particular for producing at least one V-ribbed belt, the shaping surface of the shaping body having a surface structuring which is formed as a negative profile of the ribs of the drive belt to be produced, i.e. as a rib negative. This enables in particular a particularly simple demolding of a structured drive belt, i.e. a drive belt with rib structure, by means of the apparatus according to the invention, i.e. by means of the sectors of the shaping body which can be divided from one another.

The aforementioned object is further solved by a method for manufacturing a drive belt by means of an apparatus of the type explained above, comprising the following steps:

A) providing a raw coil made from a raw material of the drive belt,
B) inserting the raw coil into the sectors of the shaping body that are not yet connected to each other or, in the case of a shaping body that is not subdivided into sectors, into the shaping body,
C) in the case of a shaping body divided into sectors, connecting the sectors of the shaping body to each other so as to obtain a closed inner cavity in which the raw coil is arranged,
D) insertion of an elastic pressure bellows into the interior of the raw coil,
E) heating the shaping body to a first temperature,
F) pressurizing an inner space of the pressure bellows for performing a pressing operation of the raw coil against the shaping surface of the first inner cavity,
G) removing the manufactured drive belt from the shaping body, wherein in the case of a shaping body divided into sectors, the sectors of the shaping body are separated from one another.

The advantages explained above can also be realized in this way. By initially heating the shaping body to a first temperature and applying pressure to the pressure bellows, a desired basic shape is imprinted on the raw coil. The first temperature can accordingly be the shaping temperature of such a manufacturing process.

In an advantageous embodiment of the invention, the previously indicated steps A) to G) can be carried out in the indicated sequence. It is possible that step F) can be carried out before or after step E) or overlapping in time with step E). The simultaneous or at least temporally overlapping pressurization during heating results in a form closure, which provides advantages with regard to the temperature distribution.

In the case of manufacturing a drive belt with a ribbed structure, step F) can be performed as follows:

F) pressurizing an inner cavity of the pressure bellows to emboss the raw coil on the surface structure of the first inner cavity.

In this way, the desired ribs of the drive belt are created during the embossing process.

According to an advantageous embodiment of the invention, it is provided that after step F) and before step G), further heating of the shaping body to a vulcanization temperature above the first temperature takes place and, when the vulcanization temperature is reached, a vulcanization insulation phase is carried out. This converts the rubber compound used for the drive belt into a vulcanizate.

According to an advantageous embodiment of the invention, it is provided that after step C) and before step D), the shaping body is inserted into an outer tube of the apparatus, and is removed from the outer tube of the apparatus before the manufactured drive belt is demolded from the shaping body in step G). This has the advantage that the multi-part shaping body is held and stabilized by the outer tube during the manufacturing process. In addition, heating of the apparatus can be performed indirectly by heating the outer tube. This again has the advantage that the apparatus does not require a heating device integrated in the shaping body.

According to an advantageous embodiment of the invention, it is provided that the heating of the shaping body is carried out by means of induction heating, conduction heating and/or by a heated gaseous medium, in particular by means of steam heating. In the case of heating by gaseous medium, for example, the outer tube may be designed as a double-walled pressure vessel through which said gaseous medium is passed, for example, in the case of steam heating the vapor.

According to an advantageous embodiment of the invention, it is provided that in step G), in the case of a shaping body divided into sectors, the sectors of the shaping body are moved away from each other in the radial direction during removal of the manufactured drive belt from the shaping body. This ensures a reliable demolding of the drive belt without risk of damage.

The apparatus can additionally have a cooling device with which the parts of the apparatus previously heated by the heating device can be quickly cooled again. The heating device together with the cooling device can form a tempering device for tempering the shaping body and, if applicable, its outer tube.

In summary, the following advantages can be achieved with the invention.

Overcoming the disadvantages of the prior art mentioned at the beginning of this document, i.e.:
  length restrictions,
  low rib quality,
  low coil height and thus high personnel costs, as well as
  the avoidance of steam vessels and thus high article-specific investment costs.

Advantageous is Also
  the use of standard industrial induction heaters instead of steam,
  the resulting reduction in infrastructure and low space requirements,
  which enables globally distributed production according to customer locations and avoids the transport of many cubic meters of air due to the low packing density of the micro V-ribbed belts and
  the economical production of special articles such as curved belts due to the relatively low costs in shaping.

BRIEF DESCRIPTION OF THE DRAWINGS

The invention is explained in more detail below by means of exemplary embodiments with the use of drawings, in which.

DETAILED DESCRIPTION OF THE INVENTION

Figure 1:
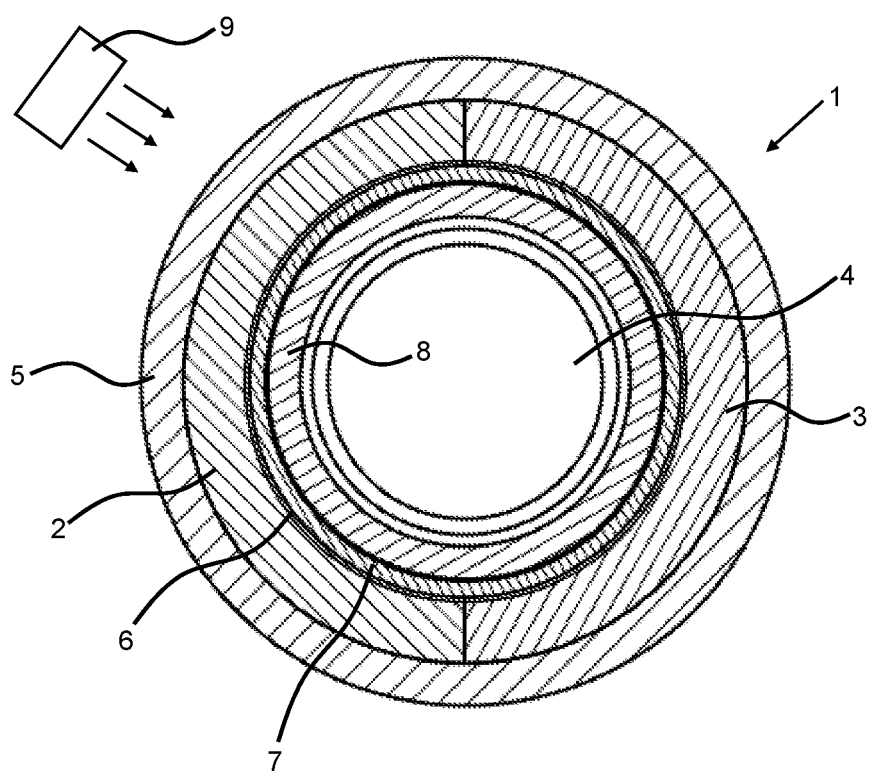
FIG. 1 shows a cross-sectional view of an apparatus for manufacturing a drive belt.

The apparatus 1 shown in FIG. 1 has a multi-part shaping body 2, 3, which in this case is divided into two individual parts forming a sector 2 and a sector 3 of the shaping body 2, 3. It can be seen that the shaping body 2, 3 has a substantially hollow cylindrical shape. On the inside, the shaping body 2, 3 has a shaping surface 6 for the abutment of the drive belt 7 to be produced. Inside the drive belt 7 or, prior to the manufacturing process, inside the raw coil, there is a pressure bellows 8 which can be subjected to an increased internal pressure in order to press the raw coil or the drive belt 7 against the shaping surface 6. Here the space between the shaping surface 6 and the outside of the pressure bellows 8 can additionally be evacuated by means of an evacuation device.

In the assembled state shown, the sectors 2, 3 are locked against movement in the axial direction by means of a locking device, e.g. by means of a cover 4, i.e. they cannot move against each other in the axial direction. The shaping body 2, 3 is arranged inside an outer tube 5. The apparatus also has a heating device 9 which is arranged to transfer heating heat to the outer tube 5. The outer tube 5 transfers the heat to the shaping body 2, 3, which has a high thermal conductivity so that the heat is evenly distributed over the shaping body 2, 3.

Sectors 2, 3 are locked against movement in the axial direction in the assembled state shown by means of a locking device, e.g. by means of a cover 4, i.e. they cannot move relative to one another in the axial direction. The shaping body 2, 3 is arranged within an outer tube 5. In addition, the apparatus has a heating device 9, which is designed to provide thermal heat to the outer tube 5. The outer tube 5 transfers the heat to the shaping body 2, 3, which has a high thermal conductivity, so that the heat is distributed evenly over the shaping body 2, 3.

Figure 2:
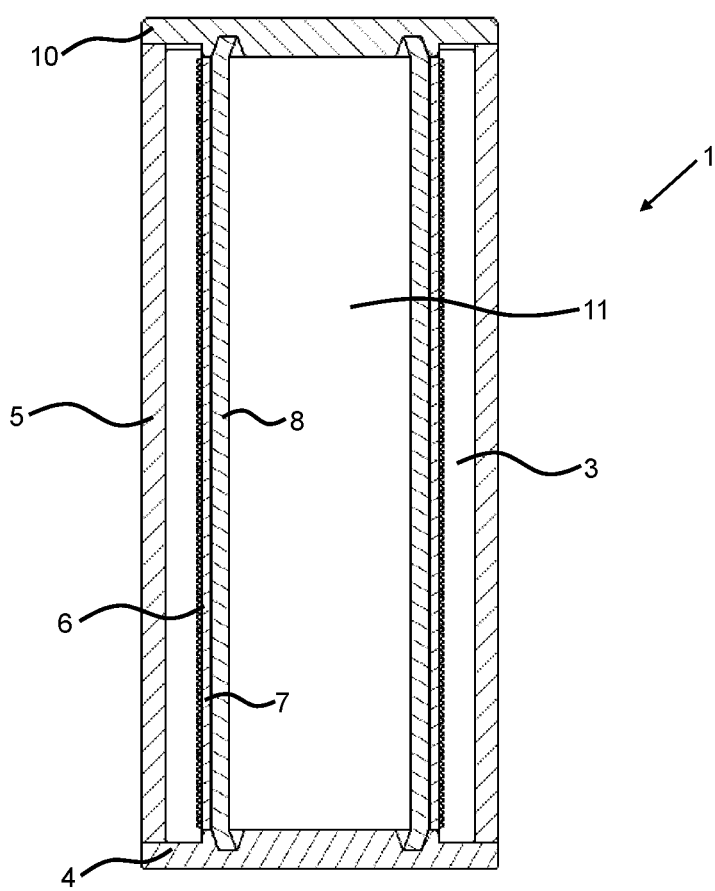
FIG. 2 shows the apparatus according to FIG. 1 in longitudinal section.

As FIG. 2 illustrates, the device 1 has a cover 4, 10 on each end face, by means of which the shaping body 2, 3 and the outer tube 5 are closed off in the longitudinal direction. At least one of the covers 4, 10 can serve as a locking device for fixing the sectors of the shaping body 2, 3 in the axial direction. To carry out the manufacturing process of the drive belt 7, the interior 11 of the pressure bellows 8 is pressurized to an excess pressure relative to atmospheric pressure.

The outer tube 5 may be configured as a ferromagnetic outer tube, for example one made of steel. The outer tube 5 has an outer diameter ADA, an inner diameter IDA and a height (or length) HA.

The shaping body 2, 3 forms a divided inner tube of the apparatus, e.g. with a fixed outer diameter ADI, an inner diameter IDI and a fixed height (or length) HI. The dividing plane of the shaping body 2, 3 can pass through the centerline of the pipe. Sectors 2, 3 can be made of a material with a higher coefficient of thermal expansion than the outer tube 5 and with good thermal conductivity, which also compensates for temperature differences in the mold. The material is preferably aluminum. The inner side of the tube has the negative profile of the ribs to be produced, so the mean inside diameter IDI is variably adapted to the belt length to be produced.

IDA and ADI can thus be adjusted to each other in such a way that there is a clearance fit at room temperature (e.g. 30° C.) and an press fit at the latest from 80° C. upwards. This allows the inner tube halves to be pushed into the outer tube at room temperature, and above 80° C., i.e. the lowest flow temperature of the coil blanks, the gap between the inner tube halves is closed.

HI and HA can be adjusted to each other so that they are higher than the raw coil at room temperature and HI<HA at the highest vulcanization temperature. Due to the cylindrical shape of the outer and inner tube, the inner tube partially slips on the outer tube 5 because of the higher coefficient of thermal expansion during heating and cooling.

The sectors can be connected, for example, by means of pins or feather keys and/or a stop of the sectors on the cover or base, which prevents axial displacement of the sectors relative to each other.

The pressure bellows 8 may be formed as a smooth rubber bladder with outer diameter ADH such that at atmospheric pressure within the pressure bellows 8, with ADH<raw coil inner diameter, the raw coil can be easily inserted and removed and at an industry standard inner pressure, the rubber bladder can press the raw coil into the ribbed negative of the inner tube. The bladder height HH can be dimensioned with HH>HA so that the rubber bladder seals the internal pressure via the cover and base. A seal relative to the outer tube 5, e.g. with O-rings, can advantageously be arranged close to the outer diameter so that any cooling water residues can be easily and completely extracted.

Cover and base can be designed with seals and sealing surfaces relative to the outer tube 5 and the pressure bellows 8 as well as to supply connections for internal bladder pressure and for mold evacuation. If the cover and base are stepped at the contact points, the above-mentioned lengths must be adapted accordingly.

It is also advantageous to treat or coat the outer and/or inner surface of the inner tube or parts thereof so that these parts are more resistant to wear or damage and have low adhesion to the coil and/or outer tube. The former is achieved e.g. by anodizing, the latter e.g. by applying a release agent—also common for steel molds. If the release agent is water-based, it is advantageous if the water is evaporated before contact with the coil blank, e.g. by heating, in order to avoid steam damage to the coil.

The heat input part of the temperature control device, i.e. the heating device 9, can comprise

- an induction heating device, e.g. a commercially available one for the joining of rolling bearings, with an induction coil having an inner diameter IDS, so that an air gap $L=\frac{1}{2} \cdot (IDS-ADA)$ is created for easy insertion and removal of the mold, which is possibly further reinforced by a cooling jacket. The windings of this coil vary in their pitch in such a way that, during heating, the different heat requirements for the middle, cover and base areas with their different heat capacities and convection conditions (e.g. chimney effect) are served in such a way that the temperature distribution is sufficiently uniform. To this end, the induction coil advantageously extends beyond the mold height in the edge areas and the coil pitch is lower here than in the center.
- And/or the design of the outer tube as a double-walled pressure vessel, again traditionally for heating with steam, wherein the investment costs are kept within limits by the multiple use of the outer tube for many belt lengths.
- In addition, both heating variants can have variable thermal insulation of the cover and/or base and/or outer tube, which reduce the heat losses of the mold and thus the energy requirement and adapt changes in the zone heat requirement. These arise because when the temperature plateau is maintained, only the heat losses have to be compensated and, as in the case of heating, the heat capacities do not also have to be served. Different heat zone requirements also arise if inner mold halves with different wall thicknesses are used for a different belt length and thus a different heat capacity in the center zone is opposed by equal heat capacities in the edge zones.

The cooling part of the temperature control device can consist of for inductive heating a water bath in which the entire shaping body 2, 3 with the outer tube 5 is immersed. The water bath has the advantage that the induction heating can already be charged with the next mold, or a cooling jacket of inductively non-heatable material such as a glass-filled plastic. The cooling jacket is located in the air gap L between the induction coil and the outer tube. It forms a cavity relative to the outer tube, which is flooded with cooling water for cooling. Advantageously, inflow/inflows are at the bottom and outflow/outflows at the top, so that the cavity fills completely with cooling water and the initially generated water vapor can escape unhindered through the outflows. Due to the unobstructed discharge, the outer tube and cooling jacket do not need to be designed as a pressure vessel. The cooling jacket has the advantage that water droplets do not have to be extracted from the mold at great expense.

for steam heating, traditionally consisting of a double-walled pressure vessel outer tube and diverters in the steam inlet and outlet that stop the flow of steam and direct cooling water into the cavity of the double-walled outer tube.

The method for producing drive belts by means of such an apparatus may proceed as follows:

1. Application of release agent to the shaping surface 6 of the shaping body 2, 3 and to the outside of the pressure bellows 8
2. Finishing of the raw coil in inverted structure, but on a separable finishing drum (e.g. wedge composite), and removal of raw coil from the finishing drum
3. Insertion of the raw coil into the opened sectors of the shaping body 2, 3, then joining of the sectors with securing of axial displacement
4. Insertion of the forming body 2, 3 and the raw coil into the outer tube 5 up to a stop at the base
5. Insertion of the pressure bellows 8 completely inside
6. Closure of mold formed in this way with cover incl. internal pressure and mold evacuation connection
7. If necessary, insertion of the mold into the induction coil
8. Heating up to embossing temperature, evacuating the mold
9. Internal pressure buildup and embossing phase
10. Heating up to vulcanization temperature and vulcanization phase
11. Switching off vacuum, cooling to near room temperature, switching off internal pressure
12. If necessary, removal of the mold from the induction coil and extraction of the water drops
13. Removing the cover, removing the pressure bellows 8 and the forming body 2, 3 incl. coil or drive belt
14. Opening of the forming body 2, 3 and "peeling away" of the coil or drive belts from the shaping surface 6
15. Repeat with new coil from step 2 or, if the release agent is used up, from step 1.

An alternative method with stop/attachment of the sectors of the forming body 2, 3 at the cover can proceed as follows and is particularly suitable for cooling with cooling jacket/double-walled outer tube, where if applicable, the outer tube, base and cooling device remain in the induction coil:

1. Application of release agent to the shaping surface 6 of the shaping body 2, 3 and to the outside of the pressure bellows 8 (as above)
2. Finishing of the raw coil in inverted structure, but on a separable finishing drum (e.g. wedge composite), and removal of raw coil from the finishing drum (as above)
3. Insertion of the raw coil into the opened sectors of the shaping body 2, 3 (as above)

Insertion of the pressure bellows 8 completely inside,

Closing the sectors of the shaping body 2, 3 and stop/fastening to the cover 4. Insertion of shaping body 2, 3/raw coil/cover into outer tube 5/base
5. Closure of the mold formed in this way incl. internal pressure and mold evacuation connection
6. Heating up to embossing temperature, evacuating the mold (as above)
7. Internal pressure buildup and embossing phase (as above)
8. Heating up to vulcanization temperature and vulcanization phase (as above)
9. Switching off vacuum, cooling to near room temperature, switching off internal pressure (as above)
10. Removing the cover/shaping body 2, 3/coil/pressure bellows 8 assembly, removing the cover and the pressure bellows 8
11. Opening of the forming body 2, 3 and "peeling away" of the coil or drive belts from the shaping surface 6 (as above)
12. Repeat with new coil from step 2 or, if the release agent is used up, from step 1 (as above).

What is claimed is:

1. A method for manufacturing at least one drive belt by means of an apparatus having a tubular shaping body having a first inner cavity which extends in a longitudinal direction of the shaping body over an entire or predominant length of the shaping body and is surrounded circumferentially by a wall of the shaping body, wherein an inner side of the wall of the shaping body facing the first inner cavity has a shaping surface for abutment and shaping of the drive belt to be produced during a manufacturing process, and at least one of a) an outer tube formed as a tubular body with a second inner cavity adapted to receive the tubular shaping body, or b) another outer part outside the tubular shaping body, wherein the outer part forms with the shaping body two radially inter-engaging components of the apparatus, and the shaping body is made of aluminum that has a higher coefficient of thermal expansion than a material of the outer tube or the outer part, the method comprising:

A) providing a raw coil made from a raw material of the drive belt,
B) inserting the raw coil into the shaping body
C) inserting an elastic pressure bellows into the interior of the raw coil,
D) heating the shaping body to a first temperature,
E) pressurizing an inner space of the pressure bellows for performing a pressing operation of the raw coil against the shaping surface of the first inner cavity, wherein step E) can be carried out before or after step D) or overlapping in time with step D),
F) removing the manufactured drive belt from the shaping body.

2. The method as claimed in claim 1, wherein after step C) and before step F), further heating of the shaping body to a vulcanization temperature above the first temperature takes place and, when the vulcanization temperature is reached, a vulcanization insulation phase is carried out.

3. The method as claimed in claim 1, wherein after step A) and before step C), the shaping body is inserted into an outer tube of the apparatus, and is removed from the outer tube of the apparatus before the manufactured drive belt is removed from the shaping body in step F).

4. The method as claimed in claim 3, wherein heating of the shaping body is performed indirectly by heating the outer tube.

5. The method as claimed in claim 1, wherein the heating of the shaping body is carried out by means of induction heating, conduction heating and/or by a heated gaseous medium.

6. The method as claimed in claim 5, wherein heating of the shaping body is carried out by steam heating.

7. The method as claimed in claim 1, wherein the shaping body is divided in the longitudinal direction into at least two individual parts which form respective sectors of the shaping body, the method further comprising:
inserting the raw coil into the sectors of the shaping body that are not yet connected to each other,
connecting the sectors of the shaping body to each other so as to obtain a closed inner cavity in which the raw coil is arranged.

8. The method as claimed in claim 7, wherein in step F), the sectors of the shaping body are moved away from each other in the radial direction during removal of the manufactured drive belt from the shaping body.

9. The method as claimed in claim 7, further comprising separating the sectors of the shaping body from one another.

10. An apparatus for manufacturing at least one drive belt, comprising:
a tubular shaping body having a first inner cavity which extends in a longitudinal direction of the shaping body over an entire or predominant length of the shaping body and is surrounded circumferentially by a wall of the shaping body, wherein an inner side of the wall of the shaping body facing the first inner cavity has a shaping surface for abutment and shaping of the drive belt to be produced during a manufacturing process, and at least one of:
a) an outer tube formed as a tubular body with a second inner cavity adapted to receive the tubular shaping body, or
b) another outer part outside the tubular shaping body, wherein the outer part forms with the shaping body two radially interengaging components of the apparatus,
wherein the shaping body is made of aluminum that has a higher coefficient of thermal expansion than a material of the outer tube or the outer part.

11. The apparatus as claimed in claim 10, wherein the shaping body is divided in the longitudinal direction into at least two individual parts which form respective sectors of the shaping body.

12. The apparatus as claimed in claim 10, wherein the outer tube or outer part is configured for tempering the tubular shaping body by heat transfer.

13. The apparatus as claimed in claim 12, wherein an inner diameter of the second inner cavity and the outer diameter of the shaping body form a clearance fit at a temperature below 30° C.

14. The apparatus as claimed in claim 12, wherein an inner diameter of the second inner cavity and the outer diameter of the shaping body form an press fit at a temperature above 80° C.

15. The apparatus as claimed in claim 10, wherein the apparatus has a heating device which is arranged for heating the outer tube or the outer part to a temperature sufficient for carrying out a manufacturing process of the drive belt.

16. The apparatus as claimed in claim 10, wherein the apparatus has a flexible and/or elastic pressure bellows, which has a smooth or structured outer surface for receiving the raw material for manufacturing the drive belt.

17. The apparatus as claimed in claim 16, wherein the pressure bellows has an outer diameter which, at atmospheric pressure inside the pressure bellows, is smaller than the inner diameter of the first inner cavity at least by the thickness of the raw material for producing the drive belt arranged between the shaping body and the pressure bellows.

18. The apparatus as claimed in claim 10, wherein the apparatus is configured for producing at least one drive belt with a rib structure, wherein the shaping surface of the shaping body has a surface structuring which is formed as a negative profile of the ribs of the drive belt to be produced.

19. The apparatus as claimed in claim 16, wherein the flexible and/or elastic pressure bellows comprises a rubber bladder.

20. The apparatus as claimed in claim 18, wherein the apparatus is configured for producing at least one drive belt with a V-rib structure.

21. The apparatus as claimed in claim 11, wherein the apparatus has a locking device, by means of which the sectors, at least in a state assembled to form the shaping body, are locked against movement in an axial direction.

* * * * *